(12) United States Patent
Sabre et al.

(10) Patent No.: US 7,309,674 B2
(45) Date of Patent: Dec. 18, 2007

(54) REFRACTORY COMPOSITION AND PROCESS FOR THE REPAIR OF A HOT REFRACTORY WALL

(75) Inventors: Serge Sabre, Montigny-en-Gohelle (FR); Christophe Jonas, Quiévrain (BE)

(73) Assignee: Vesuvius Crucible Company, Wilmington, DE (US)

(*) Notice: Subject to any disclaimer, the term of this patent is extended or adjusted under 35 U.S.C. 154(b) by 149 days.

(21) Appl. No.: 10/549,993

(22) PCT Filed: Mar. 29, 2004

(86) PCT No.: PCT/BE2004/000045

§ 371 (c)(1),
(2), (4) Date: Sep. 26, 2005

(87) PCT Pub. No.: WO2004/085341

PCT Pub. Date: Oct. 7, 2004

(65) Prior Publication Data

US 2007/0027023 A1 Feb. 1, 2007

(30) Foreign Application Priority Data

Mar. 27, 2003 (EP) .................. 03447065

(51) Int. Cl.
*C04B 35/14* (2006.01)
*C04B 12/02* (2006.01)

(52) U.S. Cl. .................. 501/133; 501/128; 106/632; 106/690; 106/691

(58) Field of Classification Search .............. 501/128, 501/133; 106/632, 690, 691
See application file for complete search history.

(56) References Cited

U.S. PATENT DOCUMENTS

| | | | | | |
|---|---|---|---|---|---|
| 4,596,601 | A | * | 6/1986 | Rueckl | 106/38.27 |
| 4,780,142 | A | | 10/1988 | Rechter | |
| 4,921,536 | A | * | 5/1990 | Rechter | 106/629 |
| 4,992,397 | A | * | 2/1991 | Hughes, Jr. | 501/124 |
| 5,340,782 | A | * | 8/1994 | Langenohl | 501/133 |
| 6,008,152 | A | * | 12/1999 | Guillo et al. | 501/54 |

* cited by examiner

*Primary Examiner*—Karl E Group
(74) *Attorney, Agent, or Firm*—Thomas J. Clinton; Donald M. Satina; James R. Williams

(57) ABSTRACT

The present invention relates to refractory composition consisting essentially of 40-90 dry weight % of amorphous silica aggregates, up to 40 dry weight % of alumina based compounds 10-15 dry weight % of clay, 0.2-2.0 dry weight % of a chemical binder and further containing 2 to 8% of water. These compositions are particularly useful for the repair of coke oven damaged wall in a gunning process.

15 Claims, No Drawings

REFRACTORY COMPOSITION AND PROCESS FOR THE REPAIR OF A HOT REFRACTORY WALL

The present invention relates to refractory compositions, in particular, amorphous silica based compositions, and to a process for the repair of a hot silica refractory wall using these compositions, in particular to a gunning process.

The present technico-commercial factors are pushing service life-time of coke ovens and other industrial furnaces made from silica refractory elements to their maximum. The proper maintenance and repair of such silica refractory assemblies is one of the critical points controlling their life time and continues to present severe problems, both from the standpoint of making a satisfactory repair and from interruption of or interference with production during the repair.

The invention is particularly well adapted for repairing refractory brick liner walls of a coke oven and will be described herein with reference to coke oven repair; however, it should be understood that the invention may be employed in repairing other high temperature silica brick walls such as glass melting furnaces and is therefore not limited to use in coke ovens.

Coke ovens are normally constructed of refractory silica brick which maintain relatively high strength even at the extreme temperatures encountered in the coking operation. Such ovens may have an overall life expectancy of 40 years or more, but may nevertheless require repair after only a few years of operation. Spalling of the refractory brick in the lining wall may commence for various reasons, including small cracks resulting, for example, from foundation settling, uneven expansion during heat-up or uncontrolled cool-down, air leaks, thermal shock and/or repeated thermal cycling during operation. The inclusion of foreign material in a coal charge can also produce "hot spots" which damage a local area. Once spalling has commenced, it can progress both to adjacent brick and more deeply into the wall until it interferes with pushing of the coke which, again, can produce more damage. Unless properly repaired, the damage can progress through the wall liner to the heating flues.

Since coke ovens are normally constructed in batteries each consisting of a large number of ovens extending in side-by-side relation with common walls between adjacent ovens, repair of an individual oven wall liner cannot, from a practical standpoint, be accomplished by simply cooling to ambient temperature only the oven needing repair since flues in the common wall are required to heat the adjacent ovens. Further, any attempt to cool one oven in a battery to a temperature that would enable workmen to enter and make repairs, even if adjacent ovens were partially cooled, can result in severe stresses due to shrinking and can cause substantial damage both to the oven being repaired and to adjacent ovens. Accordingly, it has long been the practice to repair coke oven liner walls by applying a temporary patch over the damaged area using a gunning or spraying technique wherein refractory aggregate is applied either as a slurry or in a "dry" gunning mixture which is sprayed or thrown directly onto the hot oven wall. The difficulties encountered in applying such patching material are well-known to those skilled in the art and are generally discussed, for example, in U.S. Pat. No. 3,413,385. Particular difficulty is encountered in repairing oven liner walls by the gunning process In areas which can not conveniently be reached through an open door by repairmen, protected by a heat shield, standing outside the oven.

Although various techniques and procedures have been developed for repairing hot refractory walls utilizing a gunning process, the results have not always been satisfactory.

The conventional gunning technique consists in conveying the dry refractory composition to a gunning nozzle where it is mixed with water and then gunned onto the damaged wall. An important problem observed in the conventional gunning techniques is the rebound of the gunned refractory composition against the refractory wall. Attempts to solve this long known problem tend to increase the quantity of water in the gunned composition. In turn, the incorporation of large quantities of water in the coke oven chamber generates other nuisances. It has also be observed that the dry refractory composition conveyed towards the gunning nozzle Is generally not perfectly homogeneous.

The prior art also knows semi-dry and wet gunning methods wherein the refractory composition is mixed with water before being conveyed towards the gunning nozzle. In a semi-dry gunning method, the refractory composition is premixed with a part of the necessary water by a mixer, conveyed to a special gunning nozzle, mixed with the remainder of water and then gunned through the nozzle. In a wet-gunning method, the refractory composition is pre-mixed with all of water required for gunning, conveyed towards the gunning nozzle and then gunned. These semi-dry and wet gunning methods are generally carried over against cooled or cold walls and require particular apparatus able to convey wet refractory compositions. Further, in these methods, it is often necessary to incorporate coagulants and/or dispersing agents which in turn cause other nuisances.

It is an object of the present invention to provide refractory compositions with an improved homogeneity, which can be used in a conventional dry gunning apparatus and providing excellent results when used for repairing a damaged refractory wall without requiring to cool the wall in question.

It is a further object of the present invention to provide refractory compositions which, globally, require less water for gunning and do not necessitate the use of coagulants and/or dispersing agents.

These objects and others are reached with a refractory composition consisting essentially of 40-90 dry weight % of amorphous silica aggregates, up to 40 dry weight % of alumina based compounds, 10-15 dry weight % of clay, 0.2-2.0 dry weight % of a chemical binder and comprising further 2 to 8% of water.

The quantity of clay in the composition must be comprised between 10 and 15 dry weight %. Clay provides indeed the plasticity and the sticking properties required in particular for gunning applications. If the composition comprises less than 10 dry weight % of clay, an Important part of the mixture rebounds when gunned against a wall and, by way of consequences, is lost. On the other hand, clay reduces the quality (time life, refractoriness, resistance to abrasion, . . . ) of the repaired wall and it is therefore preferable to avoid including more than 15 dry weight % of clay in the composition.

Surprisingly, it has been observed that the addition of small quantity of water in the supplied compositions comprised between 2 to 8% of water still allow the use of conventional gunning equipment (using compressed air and a rotor system) and can be gunned against a hot wall.

It has also been observed that the incorporation of 2 to 8% of water into the refractory composition allows the reduction of the quantity of water mixed with the composition in the gunning nozzle so that the global quantity of water introduced with the gunning composition is lower than with a conventional technique (6 wt. % instead of 12 wt. %).

The incorporation of water into the refractory composition permits also a better homogenisation of the composition.

The rebound during gunning operation is reduced at least of 50% compared to conventional techniques. This is improving the economics of the operation but this is also improving very much the health and safety work conditions for the operators as very limited dust is generated while gunning. This point is very important in regard of continuous requirements for improving the workers welfare.

Eventually, it has been observed that the walls repaired with the refractory composition of the invention have at least a similar life expectancy than walls repaired with conventional technique using vitreous silica based compositions.

According to a preferred embodiment of the invention, the amorphous silica aggregates comprise vitreous silica.

Suitable alumina based compounds comprise kyanite, andalusite, chamote or mullite or a mixture thereof. If present, the alumina based compounds should preferably be present in a quantity comprised between 20 and 40 dry weight %.

Preferably, the chemical binder is a mineral chemical binder selected from phosphoric acid, acid alumina phosphate, alumina sulphate or sodium silicate.

The refractory components have preferably a grain size lower than 4 mm. I.e., at least 95 wt. % of the composition has a grain size lower than or equal to 4 mm. Preferably, 100 wt. % of the composition has a grain size lower than 5.60 mm.

EXAMPLES OF PREFERRED COMPOSITIONS

| Material | Example of material | Example 1 (dry wt. %) | Example 2 (dry wt. %) |
|---|---|---|---|
| Amorphous silica aggregate | Fused silica (200 μm-4 mm) | 54.1 | 53.6 |
|  | Fused silica (<100 μm) | 31.6 |  |
| Alumina based compound | Kyanite (<100 μm) |  | 32.2 |
| Clay |  | 13.5 | 13.4 |
| Chemical binder |  | 0.8 | 0.8 |
| Water |  | 3.4 | 3.4 |

According to another of its objects, the present invention relates to a process for the repair of a hot refractory wall comprising the steps of
a) conveying a refractory composition consisting essentially of 40-90 dry weight % of amorphous silica aggregates, up to 40 dry weight % of alumina based compounds, 10-15 dry weight % of clay, 0.2-2.0 dry weight % of a chemical binder and further containing 2 to 8% of water to a gunning nozzle,
b) mixing the said refractory composition with water in the gunning nozzle;
c) gunning the obtained mixture against the hot refractory wall.

As indicated above, this process has shown surprising results as to the quality of the repaired wall, in particular for a coke oven wall.

What is claimed is:

1. A gunning refractory composition consisting essentially of 40-90 dry weight % of amorphous silica aggregates, up to 40 dry weight % of alumina-based compounds, 10-15 dry weight % of clay, 0.2-2.0 dry weight % of a chemical binder and further containing 2-8% of water.

2. A gunning refractory composition according to claim 1, wherein the amorphous silica aggregates comprise vitreous silica.

3. A gunning refractory composition according to claim 1, wherein the alumina based compounds comprise materials selected from the group consisting of kyanite, andalusite, chamote, mullite and mixtures thereof.

4. A gunning refractory composition according to claim 1, wherein the alumina-based compounds content is between 20-40 dry weight %.

5. A gunning refractory composition according to claim 1, wherein the chemical binder is a mineral chemical selected from the group consisting of phosphoric acid, acid alumina phosphate, alumina sulphate and sodium silicate.

6. A gunning refractory composition according to claim 1, wherein the refractory components have 95 wt. % of grain size lower than 4 mm.

7. A gunning refractory composition according to claim 6, wherein the refractory components have 100 wt. % of grain size lower than 5.6 mm.

8. A process for the repair of a hot silica refractory wall comprising the steps of
   a) conveying a refractory composition consisting essentially of 40-90 dry weight % of amorphous silica aggregates, up to 40 dry weight % of alumina based compounds, 10 -15 dry weight % of clay, 0.2-2.0 dry weight % of a chemical binder and further containing 2-8of water to a gunning nozzle;
   b) mixing the refractory composition with water in the gunning nozzle; and
   c) gunning the obtained mixture against the hot refractory wall.

9. A process according to claim 8, wherein the amorphous silica aggregates comprise vitreous silica.

10. A process according to claim 8, wherein the alumina based compounds comprise materials selected from the group consisting of kyanite, andalusite, chamote, mullite, and mixtures thereof.

11. A process according to claim 8, wherein the alumina based compounds content is between 20-40 dry weight %.

12. A process according to claim 8, wherein the chemical binder is a mineral selected from the group consisting of phosphoric acid, acid alumina phosphate, alumina sulphate and sodium silicate.

13. A process according to claim 8, wherein the refractory components have 95 wt. % of grain size lower than 4 mm.

14. A process according to claim 13, wherein the refractory components have 100 wt. % of grain size lower than 5.6 mm.

15. A process according to claim 8, wherein the refractory wall is a coke oven wall.

* * * * *